United States Patent Office 3,075,362
Patented Jan. 29, 1963

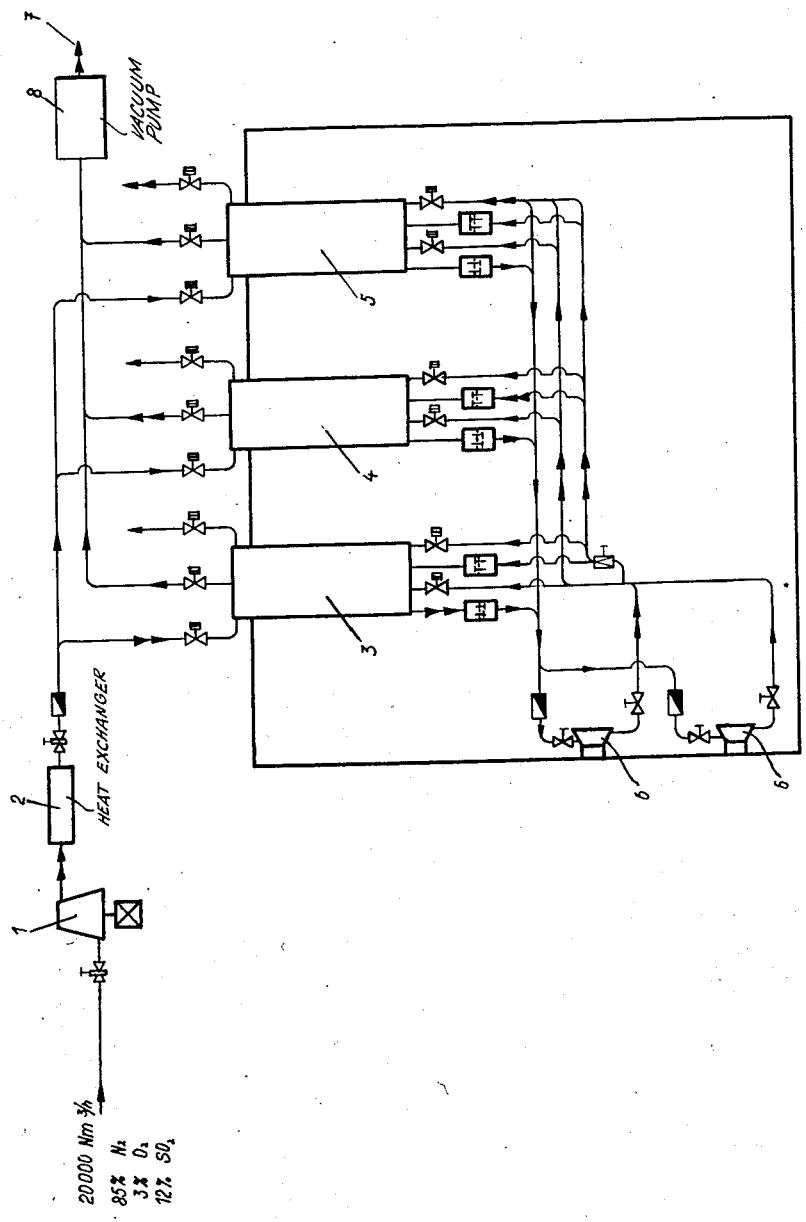

3,075,362
PROCESS FOR SEPARATING SO₂ AND CONSTITUENTS OF A SIMILAR DEW POINT FROM GASES BY MEANS OF REGENERATORS
Rudolf Becker, Munich-Solln, Germany, assignor to Gesellschaft für Linde's Eismaschinen Aktiengesellschaft, Munich, Germany, a company of Germany
Filed Aug. 11, 1958, Ser. No. 754,217
Claims priority, application Germany Sept. 25, 1957
1 Claim. (Cl. 62—12)

The invention concerns a gas decomposing and liquefying plant operating at low temperatures. Usually there is used for the production of cold a gas which has first been brought to a higher temperature and then expanded work-producingly by means of a machine, for example, a turbine. The gas current entering the turbine is generally taken from the regenerator, cooled by decomposition products, or branched off from the pressure gas current issuing from this regenerator. In order to prevent the formation of condensate of carbon-dioxide—CO₂ ice or snow, for example—in the expansion turbine, the gas current entering the turbine has first been preheated in a heat exchanger and/or purified by means of adsorptive agents. Both the heat exchanger and the adsorbers considerably increased the cost of the entire plant.

According to German Patent No. 707,079, it is also known to carry out a process for the separation of gaseous impurities, particularly of carbon dioxide and gaseous sulfur compounds, from gas mixtures containing the same by freezing the impurities to solid bodies during the cooling of the gas mixture in periodically exchanged cold storage tanks and re-evaporating the solid constituents separated from the gas by means of an auxiliary gas in such manner that hydrogen-rich gas mixtures, particularly crude gases for the synthesis of benzine, are cooled to the dew point of the principal constituent present in the gas and having the highest dew point. In this process it is possible to connect the expansion turbine used for providing the cold directly to the regenerator arrangement, because all impurities contained in the starting mixture—particularly carbon dioxide—which could produce solid separations in the turbine are completely eliminated by the regenerators. The object of this process was to produce a synthetic residual synthesis gas with a low content of carbon dioxide, whose transformation to synthesis gas was no longer rendered difficult by the high CO₂ content. The fact that on this occasion the constituents which are harmful for the operation of the expansion turbine are also eliminated, was a secondary feature, it was not however the subject of the problem underlying this process.

If the above mentioned known process were used only for carrying out the problem underlying the present invention, namely, to avoid the formation of condensates, ice or snow in the expansion turbine and not for purifying a subsequent worked up synthesis gas this would be an uneconomical process. The problem underlying the present invention is completely different from the above mentioned known problem, since the gases to be freed from SO₂ and other constituents initially contain CO₂ in a concentration not more than 0.5 percent. Only because of the completely different problem was the described process justified in a situation where the economical optimum of the cooling temperature, which was found corresponding to a carbon dioxide content of 1 to 2% in the purified gas at a temperature of about −115 to −125 deg. C., was intentionally abandoned and a higher energy consumption was used.

The problem underlying the present invention consists in purifying a gas mixture, expanded by a machine, preferably a turbine, in a simpler and less expensive manner. It relates particularly to a process for removing SO₂ and other substances of a similar or higher dew point by means of low-temperature cooling in reversible regenerators or counterflow-heat exchangers (reversing heat exchangers) from gas mixtures containing a maximum of 0.5% carbon dioxide, which are then expanded work producingly in an expansion machine, preferably a turbine.

In this application the expression "reversing heat exchangers" is meant to include reversible heat exchangers which may or may not comprise a heat storage mass.

This inventive object is, by the procedure of the present invention, attained by selecting such an end temperature of the compressed gas—to be expanded in the turbine—that after the compressed gas issues from the regenerator arrangement there is no separation of liquid, ice or snow which would be harmful to the turbine were it to be present in the compressed gas admitted into the turbine. In particular, the temperature produced according to the invention at the cold end of the regenerator arrangement is such that a partial pressure of the constituent to be separated relates to a partial volume of at most 5 to 50×10⁻⁴, and possibly not less than about 10⁻⁴, percent by volume in the gas mixture to be expanded.

The process of the present invention eliminates entirely or at least partly the heat exchanger and adsorber arrangement respectively which had been necessary up to now.

Surprisingly, it was also found that it is not even necessary to use excessively low temperatures to obtain the specific low partial pressure for the various impurities and other constituents, which is still admissible without damaging the expansion machine, particularly the turbine, by traces of condensates and/or solid products separated therein. Since the invention also relates to the application in gas mixtures having comparatively low carbon dioxide content, for example, for the recovery of solvents, like carbon sulfide or methanol from air or for separating SO₂ preferably from roast gases, the process according to the invention works at the limit of an optimum economy, which is not possible in the known processes working at the dew point of the principal constituent.

In order to eliminate the influence of last traces of condensates and solid constituents respectively accumulating in the expansion machine, it is possible—according to a special feature of the invention—to work alternately with at least two different expansion machines, one of which is scavenged intermittently with a neutral gas and if necessary, heated.

An apparatus for carrying out the process according to the invention is represented schematically and by way of an example in the attached drawing.

The apparatus so illustrated is one adapted to be used for recovering SO₂ from a roast gas containing the same.

A roast gas, dried with sulfuric acid and freed from dust and SO₃, and containing about 10–15% SO₂, is brought by means of a turbo blower 1 to a pressure of about 1.6 atm. After preliminary cooling in a water cooler 2, it is cooled in the regenerators 3, 4 and 5 respectively which are reversed in a three-stroke cycle by pneumatic control. In the first regenerator the gas is cooled to about −120° C. The SO₂ contained in the roast gas is deposited partly in solid form on the surfaces of the filling bodies in the regenerator. The next regenerator is evacuated by a vacuum pump 8 with addition of scavenging gas; thereby SO₂ evaporates again. The last regenerator withdraws cold from the SO₂-free waste gas.

According to the invention one of two expansion turbines 6, 6 is connected directly to the regenerator—in the assumed valve position, regenerator 3—traversed by the crude gas. This is possible (*a*) because the partial pressure of the $SO_2$ becomes so low during the cooling of the crude gas to about $-120°$ C. that there remain only about 5 p.p.m. $SO_2$ ($5 \times 10^{-4}$ percent by volume $SO_2$) in the total gas and (*b*) because the content of carbon dioxide in the initial gases to be freed from the high boiling constituents is less than 0.5 percent and its dew point is lower than $-120°$ C. These small residual amounts of $SO_2$ are no longer harmful for the expansion machine, since the small amount of $SO_2$ in the gas leaving the regenerator has no effect on the turbine while on the other hand, the relatively low temperature of $-120°$ C. can be tolerated without deteriorating the refrigerating power of the expansion process. The crude gas expanded in the expansion turbine 6 is led off through the regenerator 5. The small amount of gas is taken from this waste gas current for scavenging the regenerator 4. The turbine produces so much cold that the losses in the regenerator plant are compensated for. The concentrate, enricred to about 50% $SO_2$, is taken from the plant at 7. The current flow of gas, at the valve setting shown in the drawing, is indicated in the drawing by double arrows. The two expansion turbines 6, 6 can be interchanged in this way that the second turbine is used for the expansion of the $SO_2$-free crude gas when the first regenerator is being freed by means of a scavenging gas from $SO_2$-deposits found therein.

I claim:

In a process of preventing the deposition of condensates of $SO_2$ and other substances of a similar dew point during the work-performing expansion of compressed cold roast gas containing the same and also $CO_2$ in an amount not greater than 0.5%, the improvement which consists essentially in cooling the roast gas by means of reversing heat-exchangers to a low temperature such that the $CO_2$ content of the roast gas is not condensed whilst the $SO_2$ content of the roast gas in reduced to a content of at least about $1 \times 10^{-4}$ and at most about 5 to $50 \times 10^{-4}$ percent by volume of $SO_2$ before expanding it.

References Cited in the file of this patent

UNITED STATES PATENTS

| | | |
|---|---|---|
| 2,089,558 | Karwat | Aug. 10, 1937 |
| 2,411,680 | Dennis | Nov. 26, 1946 |
| 2,520,862 | Swearington | Aug. 29, 1950 |
| 2,708,831 | Wilkinson | May 24, 1955 |
| 2,760,356 | Sixsmith | Aug. 28, 1956 |

OTHER REFERENCES

Gas Liquefaction and Rectification (Davies), published by Longmans, Green and Company, Incorporated (New York), 1949, pages 83 and 84, relied on.